United States Patent
Saito et al.

(10) Patent No.: US 8,094,655 B2
(45) Date of Patent: *Jan. 10, 2012

(54) COMMUNICATION SCHEME WITH ARBITRATION MECHANISM FOR CASES OF ADDRESS INITIALIZATION AND SERVER SETTING

(75) Inventors: Takeshi Saito, Meguro-ku (JP); Keiichi Teramoto, Kawasaki (JP); Hiroyuki Aizu, Yokohama (JP); Shuichi Kyuma, Ota-ku (JP); Yoshiki Terashima, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 785 days.

This patent is subject to a terminal disclaimer.

(21) Appl. No.: 12/176,905

(22) Filed: Jul. 21, 2008

(65) Prior Publication Data

US 2008/0287135 A1 Nov. 20, 2008

Related U.S. Application Data

(63) Continuation of application No. 10/614,812, filed on Jul. 9, 2003, now Pat. No. 7,411,952.

(30) Foreign Application Priority Data

Jul. 9, 2002 (JP) ................................ 2002-200247

(51) Int. Cl.
*H04L 12/28* (2006.01)
*H04H 20/71* (2008.01)
*H04W 4/00* (2009.01)

(52) U.S. Cl. ........ 370/389; 370/312; 370/313; 370/475; 455/41.1; 455/41.2; 455/41.3; 709/245

(58) Field of Classification Search .................. 370/389, 370/474, 475, 312, 313; 709/245; 455/41.1, 455/41.2, 41.3
See application file for complete search history.

(56) References Cited

U.S. PATENT DOCUMENTS

| | | | |
|---|---|---|---|
| 6,546,003 B1 | 4/2003 | Farris | 370/ 352 |
| 6,570,857 B1 | 5/2003 | Haartsen et al. | 370/ 312 |
| 6,745,038 B2 * | 6/2004 | Callaway et al. | 455/456.1 |
| 6,832,321 B1 | 12/2004 | Barrett | 726/11 |
| 6,879,810 B2 * | 4/2005 | Bouet | 455/41.2 |
| 6,925,074 B1 | 8/2005 | Vikberg et al. | 370/338 |
| 7,042,863 B1 | 5/2006 | Morris | 370/ 338 |
| 7,136,645 B2 | 11/2006 | Hanson et al. | 455/ 435.1 |
| 7,136,928 B2 | 11/2006 | Saito et al. | 709/230 |

(Continued)

FOREIGN PATENT DOCUMENTS

JP   3-135130   6/1991

(Continued)

*Primary Examiner* — Nimesh Patel
*Assistant Examiner* — Allahyar Kasraian
(74) *Attorney, Agent, or Firm* — Oblon, Spivak, McClelland, Maier & Neustadt, L.L.P.

(57) ABSTRACT

The other communication devices are prohibited to transmit the address initialization request for a prescribed period of time since one communication device transmitted the address initialization request for an address managed by a control protocol, so that the conflict of the initialization requests for the same address will not occur and the problem of assigning the address in overlap to the communication devices will not arise. Also, the other communication devices are prohibited to transmit the address server detection request packet for a prescribed period of time since one communication device transmitted the address server detection request packet, so that the conflict on the network by a plurality of address server detection requests will not occur, and it is possible to determine the MAC address server uniquely.

9 Claims, 11 Drawing Sheets

U.S. PATENT DOCUMENTS

| | | |
|---|---|---|
| 7,152,114 B2 | 12/2006 | Yasaki et al. ............... 709/238 |
| 7,161,941 B1 | 1/2007 | Schmidl et al. ............. 370/392 |
| 7,194,760 B2 | 3/2007 | Nordman et al. ............ 726/5 |
| 2001/0005368 A1 | 6/2001 | Rune ........................... 370/390 |
| 2002/0051450 A1 | 5/2002 | Ganesh et al. .............. 370/389 |
| 2002/0052960 A1 | 5/2002 | Trisno et al. ................ 709/226 |
| 2002/0083331 A1 | 6/2002 | Krumel ........................ 173/200 |
| 2002/0105931 A1 | 8/2002 | Heinonen et al. ........... 370/338 |
| 2002/0150249 A1 | 10/2002 | Ohkita et al. ................ 380/270 |
| 2002/0167965 A1 | 11/2002 | Beasley et al. .............. 370/465 |
| 2002/0169886 A1 | 11/2002 | Saito et al. .................. 709/230 |
| 2003/0124979 A1* | 7/2003 | Tanada et al. ................ 455/41 |
| 2003/0177249 A1 | 9/2003 | Takanashi et al. ........... 709/229 |
| 2003/0177267 A1 | 9/2003 | Orava et al. ................. 709/245 |
| 2004/0001007 A1 | 1/2004 | Inoue et al. ................. 340/825.52 |
| 2004/0034705 A1 | 2/2004 | Focsaneanu .................. 709/225 |

FOREIGN PATENT DOCUMENTS

| | | |
|---|---|---|
| JP | 10-031657 | 2/1998 |
| JP | 10-308697 | 11/1998 |
| JP | 2000-183941 | 6/2000 |
| JP | 2000-269991 | 9/2000 |
| JP | 2002-112324 | 4/2002 |

* cited by examiner

FIG. 3A

| HARDWARE ADDRESS (BLUETOOTH ADDRESS) | IP ADDRESS | ECHONET ADDRESS (NODE ID OR MAC ADDRESS) |
|---|---|---|
| $L_0$ | $IP_0$ | — |
| $L_a$ | $IP_a$ | $MAC_a$ |
| $L_b$ | $IP_b$ | $MAC_b$ |
| ... | ... | ... |

FIG. 3B

| ALREADY UTILIZED MAC ADDRESS |
|---|
| $MAC_x$ |
| $MAC_y$ |
| $MAC_z$ |
| ... |

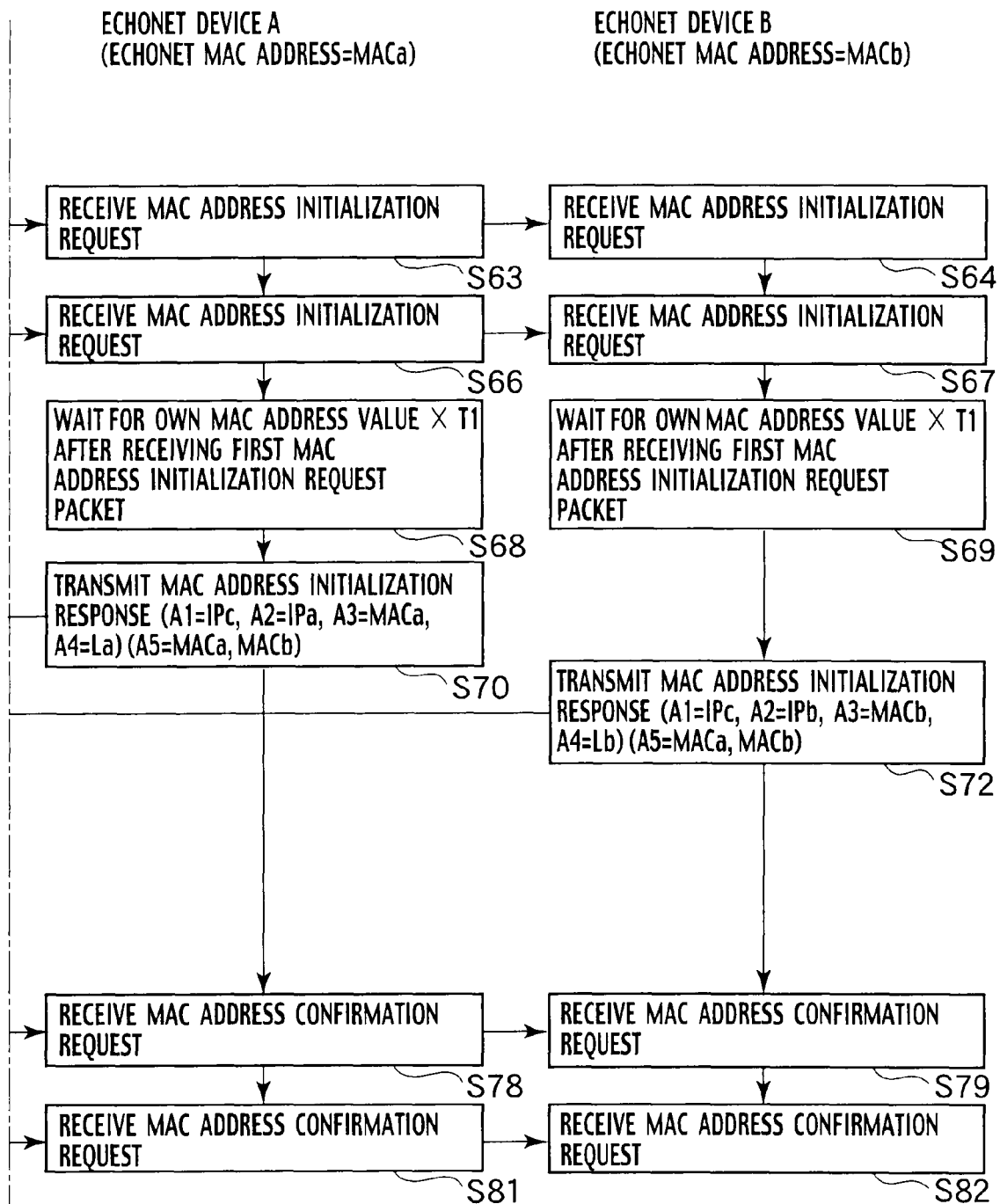

COMMUNICATION SCHEME WITH ARBITRATION MECHANISM FOR CASES OF ADDRESS INITIALIZATION AND SERVER SETTING

CROSS-REFERENCE TO RELATED APPLICATIONS

This application is a continuation of U.S. patent application Ser. No. 10/614,812, filed Jul. 9, 2003, which is based upon and claims the benefit of priority from prior Japanese Application No. 2002-200247, filed Jul. 9, 2002. The entire contents of all of the above applications are incorporated herein by reference.

BACKGROUND OF THE INVENTION

1. Field of the Invention

The present invention relates to a communication device, a communication system and a communication method for carrying out communications by using a prescribed control program on a network such as the Echonet.

2. Description of the Related Art

In recent years, there has been active development of the so called information home electronics in which a communication function is provided in home appliances such as refrigerator, washer, etc., AV home electronics, information devices such as PC, mobile devices such as portable telephone, etc., and various functions utilizing the digital technology have been proposed for each device.

One of the applications of the information home electronics is the use of a home network. The home network is a network technology developed for a network inside the home, for interconnecting various information home electronics mentioned above and carrying out communications.

As this type of the home network technology, the Internet technology has been attracting much attentions recently. For example, many applications that are attractive to the home network users such as those of music distribution, home page viewing, e-mails, etc., have been developed and the number of users is steadily increasing.

On the other hand, one exemplary application of the home network is a facility related network, or the use of the home network for the home automation. It is possible to connect air conditioners, lights, home appliances, etc., to the home network and carry out applications such as device state monitoring, remote controlling, etc.

In Japan, the Echonet is expected to be the de facto standard for this type of the facility related network. The Echonet defines commands, protocols, objects, API, etc. for controlling facility related devices (home appliances, etc.) on various physical media such as electric power lines, twisted pair lines, etc. Further details of the Echonet can be found in documents disclosed at the URL "http://www.echonet.gr.jp", for example. The Echonet is standardized by a consortium founded mainly by several Japanese electronics companies, which has already issued the specification version 1, and the commercial application is about to start.

The Echonet has its own address system, so that there is a need for a mechanism to use the address system of the Echonet on the address system of the Internet. The Echonet address is a logical address, so that there is a need to carrying out a procedure for determining the Echonet address at a time of turning on the power of the device, for example.

However, the determination of the Echonet address is a part of the initialization procedure which have to be carried out by all nodes, so that it is necessary to account for a problem such as "if a plurality of nodes that are wishing to use the same address exist simultaneously at a time of the initialization, how this situation should be handled", and in the case of determining a specific server at a time different from a time of determining the address, a problem such as "if a plurality of nodes that are trying to becomes a specific server exist simultaneously, how this situation should be handled". Otherwise, the problem of the conflict will arise, and in the worst case, there is a possibility for an occurrence of a situation in which the overlap of addresses or servers occurs, or else the initialization processing is repeated indefinitely.

As for the determination of the address to be used for communications, there has been a proposition disclosed in Japanese patent application laid open No. 2000-183941, for example.

BRIEF SUMMARY OF THE INVENTION

It is therefore an object of the present invention to provide a communication device, a communication system and a communication method which have an appropriate arbitration mechanism even in the case where the conflict occurs at a time of the address initialization or at a time of the server setting.

According to one aspect of the present invention there is provided a communication device for carrying out communications with other communication devices by using a prescribed control protocol on a network, comprising: a tentative address determination unit configured to determine a tentative address which is a candidate for one of addresses managed by the prescribed control protocol; a packet transmission unit configured to transmit an address initialization packet containing the tentative address to the network, in order to check presence/absence of another communication device which is using an address identical to the tentative address; an address determination unit configured to determine the tentative address as an address of the communication device, when no response packet from another communication device indicating that an address identical to the tentative address is currently used is received within a first prescribed period of time since transmitting the address initialization packet; and a transmission prohibition unit configured to prohibit a transmission of the address initialization packet within a second prescribed period of time since receiving the address initialization packet transmitted from another communication device.

According to another aspect of the present invention there is provided a communication device for carrying out communications with other communication devices by using a prescribed control protocol on a network, comprising: a packet transmission unit configured to transmit an address server detection request packet for requesting to become an address server which has a right to determine addresses managed by the prescribed control protocol; a server determination unit configured to determine the communication device as the address server, when no response packet from another communication device indicating that it is the address server is received within a first prescribed period of time since transmitting the address server detection request packet; and a transmission prohibition unit configured to prohibit a transmission of the address server detection request packet within a second prescribed period of time since receiving the address server detection request packet transmitted from another communication device.

According to another aspect of the present invention there is provided a communication method of a communication device for carrying out communications with other communication devices by using a prescribed control protocol on a network, the communication method comprising: determining a tentative address which is a candidate for one of addresses managed by the prescribed control protocol; transmitting an address initialization packet containing the tentative address to the network, in order to check presence/absence of another communication device which is using an address identical to the tentative address; determining the tentative address as an address of the communication device, when no response packet from another communication device indicating that an address identical to the tentative address is currently used is received within a first prescribed period of time since transmitting the address initialization packet; and prohibiting a transmission of the address initialization packet within a second prescribed period of time since receiving the address initialization packet transmitted from another communication device.

According to another aspect of the present invention there is provided a communication method of a communication device for carrying out communications with other communication devices by using a prescribed control protocol on a network, the communication method comprising: transmitting an address server detection request packet for requesting to become an address server which has a right to determine addresses managed by the prescribed control protocol; determining the communication device as the address server, when no response packet from another communication device indicating that it is the address server is received within a first prescribed period of time since transmitting the address server detection request packet; and prohibiting a transmission of the address server detection request packet within a second prescribed period of time since receiving the address server detection request packet transmitted from another communication device.

According to another aspect of the present invention there is provided a computer program product for causing a computer to function as a communication device for carrying out communications with other communication devices by using a prescribed control protocol on a network, the computer program product comprising: a first computer program code for causing the computer to determine a tentative address which is a candidate for one of addresses managed by the prescribed control protocol; a second computer program code for causing the computer to transmit an address initialization packet containing the tentative address to the network, in order to check presence/absence of another communication device which is using an address identical to the tentative address; a third computer program code for causing the computer to determine the tentative address as an address of the communication device, when no response packet from another communication device indicating that an address identical to the tentative address is currently used is received within a first prescribed period of time since transmitting the address initialization packet; and a fourth computer program code for causing the computer to prohibit a transmission of the address initialization packet within a second prescribed period of time since receiving the address initialization packet transmitted from another communication device.

According to another aspect of the present invention there is provided a computer program product for causing a computer to function as a communication device for carrying out communications with other communication devices by using a prescribed control protocol on a network, the computer program product comprising: a first computer program code for causing the computer to transmit an address server detection request packet for requesting to become an address server which has a right to determine addresses managed by the prescribed control protocol; a second computer program code for causing the computer to determine the communication device as the address server, when no response packet from another communication device indicating that it is the address server is received within a first prescribed period of time since transmitting the address server detection request packet; and a third computer program code for causing the computer to prohibit a transmission of the address server detection request packet within a second prescribed period of time since receiving the address server detection request packet transmitted from another communication device.

Other features and advantages of the present invention will become apparent from the following description taken in conjunction with the accompanying drawings.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 3A and 3B are diagrams showing an exemplary internal structure of an address table used in the Echonet device of FIG. 2.

FIGS. 6A and 6B are a flow chart showing another exemplary Echonet MAC address initialization processing procedure to be carried out by the Echonet device according to the first embodiment of the present invention.

DETAILED DESCRIPTION OF THE INVENTION

Figure 1:
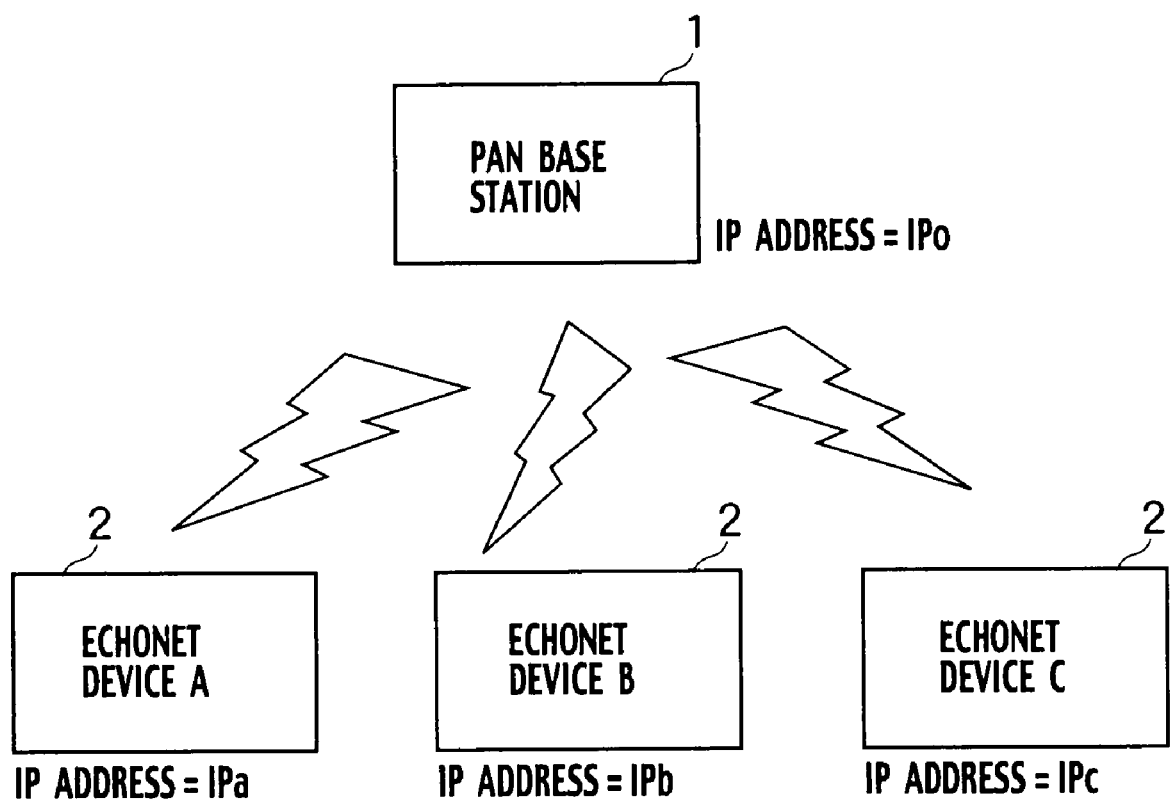
FIG. 1 is a diagram showing a schematic configuration of a home network system according to the first embodiment of the present invention.

Referring now to the drawings, wherein like reference numerals designate identical or corresponding parts throughout the several views.

Referring now to FIG. 1 to FIG. 7, the first embodiment of a communication device, a communication system and a communication method according to the present invention will be described in detail.

In the following, the case of operating the Echonet protocol on the Internet Protocol (IP) network by mapping the Echonet protocol onto the IP will be described. Note that the present invention is not limited to any specific version of IP so that IP referred here can be either IPv4 or IPv6, for example.

Also, this embodiment is directed to the exemplary case of using a configuration for connecting nodes (such as various home appliances and their controllers, for example) by using the local radio network technology called Bluetooth™. Here, the Bluetooth™ is a local radio network characterized by its low cost and low power consumption, and its further details can be found in documents disclosed at the URL "http://www.bluetooth.com", for example.

On the Bluetooth™, the "IP over Bluetooth" scheme is defined by the PAN (Personal Area Network) profile, and this embodiment is directed to the exemplary case of using this scheme. Here, the PAN is an Ethernet™ emulation specification defined on the Bluetooth™ such that it becomes possible to exchange Ethernet™ frames on the Bluetooth™ by using this mechanism.

FIG. 1 shows an exemplary configuration of the home network system in this embodiment. This home network system of FIG. 1 has a base station (also called PAN base station) 1 and a plurality (A, B, and C in an example of FIG. 1) of Echonet devices 2 which carry out communications by using the Bluetooth™.

The base station (PAN base station) 1 is a master of the Bluetooth™ piconet. In this embodiment, this base station 1 is assumed to be not an Echonet node (although the base station 1 may very well be an Echonet node).

The Echonet devices 2 can be any devices including home appliances, AV devices, information devices such as PCs, as long as they support the Echonet.

Note that the base station 1 may have a function for controlling (or monitoring) the Echonet devices 2 through the Bluetooth™. It is also possible to provide a function for controlling (or monitoring) the Echonet devices 2 through the Bluetooth™ at another node not shown in the figure.

Each one of these devices (the base station 1 and the Echonet devices A, B and C in FIG. 1) has an IP address. The IP address can be either an IPv4 address or an IPv6 address. Here, the IP address is assumed to be a private address or a link local address. The private address is an address using an address space which is permitted to be used within a limited private network space, so that the overlap of address with networks of other areas is tolerable. On the other hand, the link local address is a special IP address, which can be used only on that link (which is the Bluetooth™ in this embodiment).

When the private address is used, communications in a direction of "private address_T global IP address" is possible but communications in the opposite direction is not possible. On the other hand, when the link local address is used, the communication with the global IP address is not possible. This is a scheme that is used in the case where there is no need to give a globally unique IP address as addresses of both sides which carry out communications but a specific application of the IP is to be operated on a local network (link network).

The Echonet protocol is a protocol developed by presupposing the local network as its target, so that it is possible to use the private address or the link local address even on the IP, while the use of these addresses makes it possible to prevent erroneous accesses or malicious accesses to the Echonet operating range and the home appliances from outside of the home.

Figure 2:
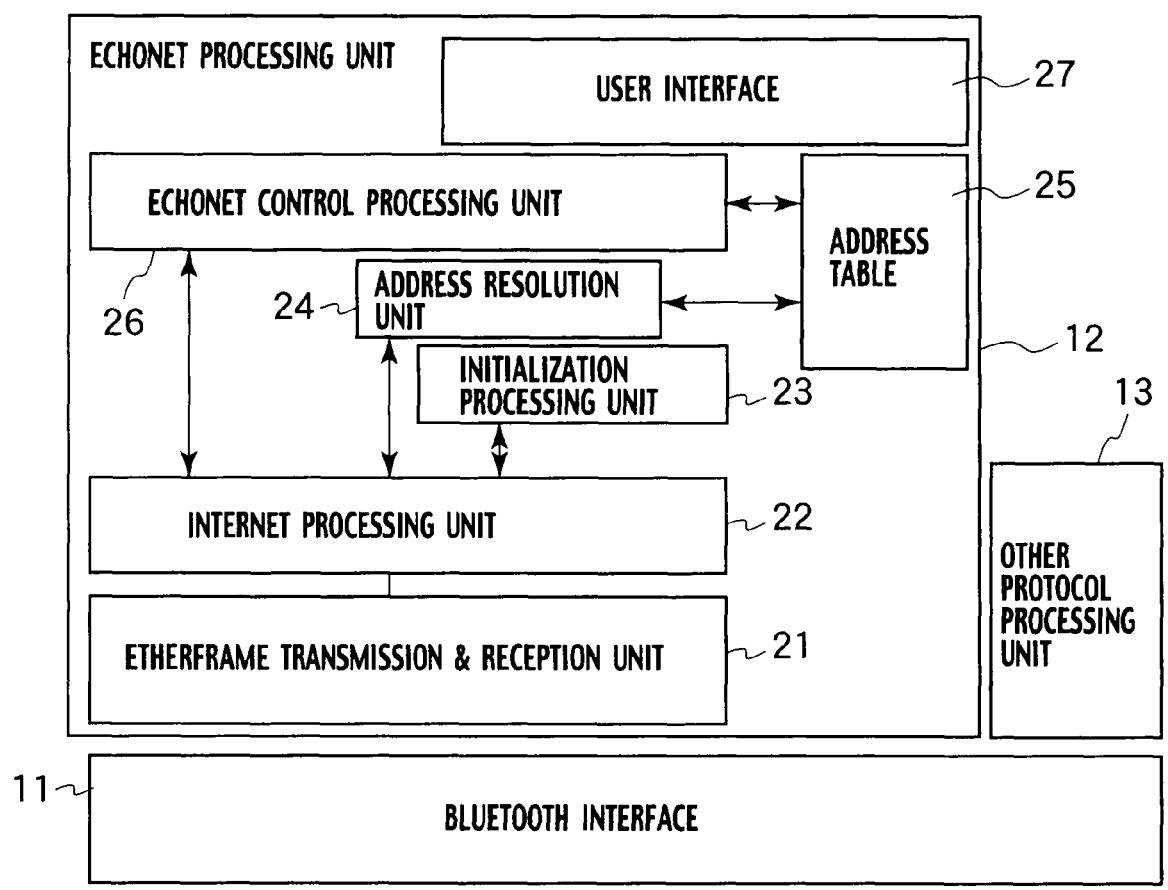
FIG. 2 is a block diagram showing an exemplary internal configuration of an Echonet device according to the first embodiment of the present invention.

FIG. 2 shows an exemplary internal configuration of the Echonet device 2. As shown in FIG. 2, the Echonet device 2 has a Bluetooth interface 11 for carrying out radio communications according to the Bluetooth, an Echonet processing unit 12 for carrying out the Echonet processing, and an other protocol processing unit 13 for carrying out prescribed protocol processing.

The Echonet processing unit 12 has an Ethernet frame transmission/reception unit 21 for carrying out transmission/reception of Ethernet frames with the Bluetooth interface 11, an Internet processing unit 22 for carrying out transmission/reception of Internet packets, an initialization processing unit 23 for carrying out the initialization processing for the Echonet on Bluetooth, an address resolution unit 24 for carrying out the address resolution between the Echonet address and the IP address, an address table 25 for storing correspondences between the IP addresses and the Echonet addresses, an Echonet control processing unit 26 for carrying out the Echonet command processing and middleware processing in general, and a user interface 27 such as a liquid crystal screen, a touch panel, a keyboard, etc.

FIGS. 3A and 3B show an exemplary internal structure of the address table 25 in this embodiment. As shown in FIG. 3A, the address table 25 stores the correspondences between the IP addresses (private address or link local addresses in this embodiment) of the Echonet nodes existing in that IP subnet (more specifically, its link local space) and (MAC addresses or node IDs (node identifiers) of) the Echonet addresses of these nodes.

Also, as shown in FIG. 3B, the Echonet device 2 has a table for storing a group of Echonet addresses already used by the other Echonet devices 2 at a given timing.

Here, the Echonet MAC address is a logical identifier of 8 bits length, which has a specification as defined in the Echonet specification. Note that the Echonet specification also defines a network identifier called net ID, but in this embodiment, it is assumed that the net ID is fixed and a node ID to be assigned individually to the node will be utilized. For this value, there is also a possibility of having different values assigned depending on cases.

Note that, in the example of FIG. 3A, the subscript O indicates those corresponding to the base station 1 of FIG. 1, while the subscripts a and b indicate those corresponding to the Echonet devices A and B of FIG. 1, respectively.

Note that, in this embodiment, if the base station (PAN base station) 1 is an Echonet node, its internal configuration is basically the same as that of the Echonet device 2 shown in FIG. 1. However, in such a case, the Ethernet frame transmission/reception unit 21 in the base station 1 contains a function for carrying out the routing of Ethernet frames (an Ethernet frame routing unit). This Ethernet frame routing unit carries out the following processing, for example. Namely, it checks whether the received Ethernet frame is destined to this node or not, and transmits that Ethernet frame toward the destination if it is not destined to this node, or transfers that Ethernet frame to a corresponding internal processing unit by referring to the Ethernet type field if it is destined to this node. In this case, the Echonet address value of the base station 1 that is an Echonet node may be a fixed value such as 0 or 1, for example.

It is possible to realize the simplification of the processing by fixedly assigning a special Echonet MAC address to a node in a position of the Bluetooth™ master, because such a node plays special roles (for carrying out the Ethernet frame routing, the address resolution, the initialization processing, etc.) as the Echonet node, as in the Bluetooth™ of this embodiment.

In the following, the Echonet MAC address initialization procedure will be described.

Figure 4A:
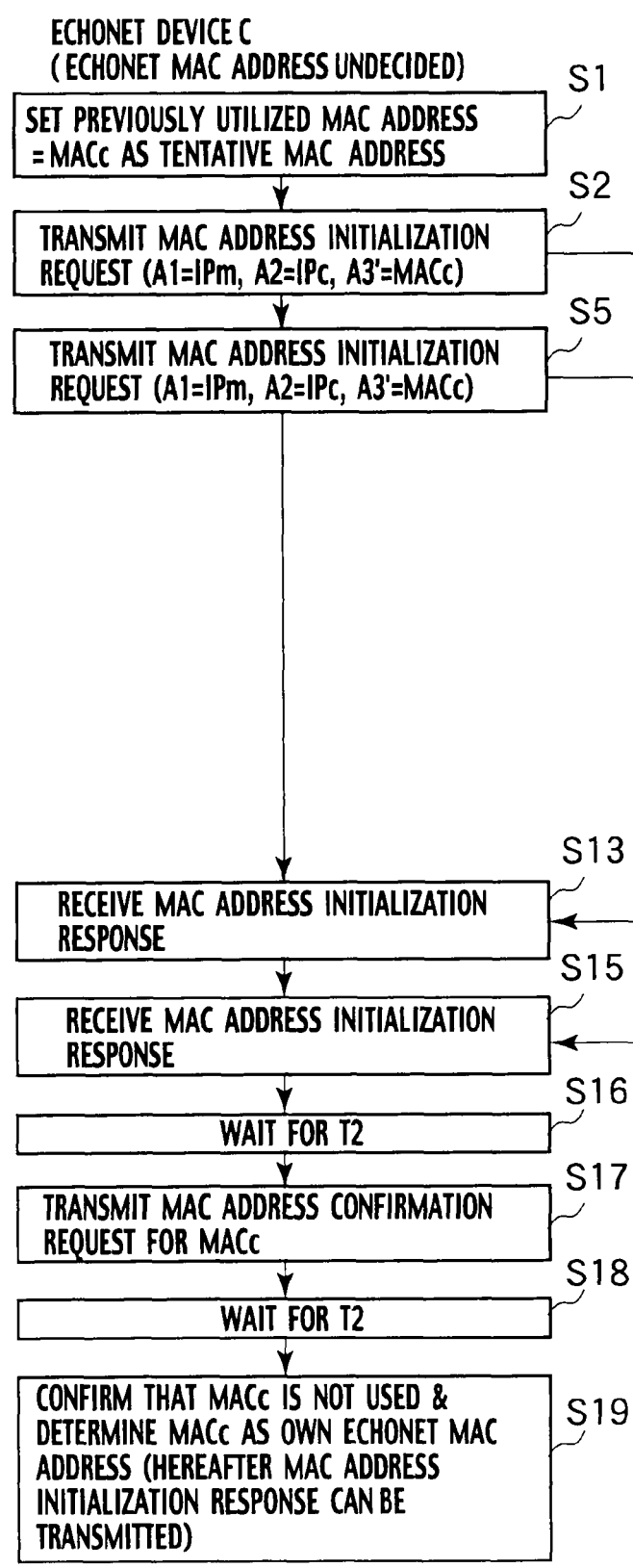
FIGS. 4A and 4B are a flow chart showing one exemplary Echonet MAC address initialization processing procedure to be carried out by the Echonet device according to the first embodiment of the present invention.
Figure 4B:
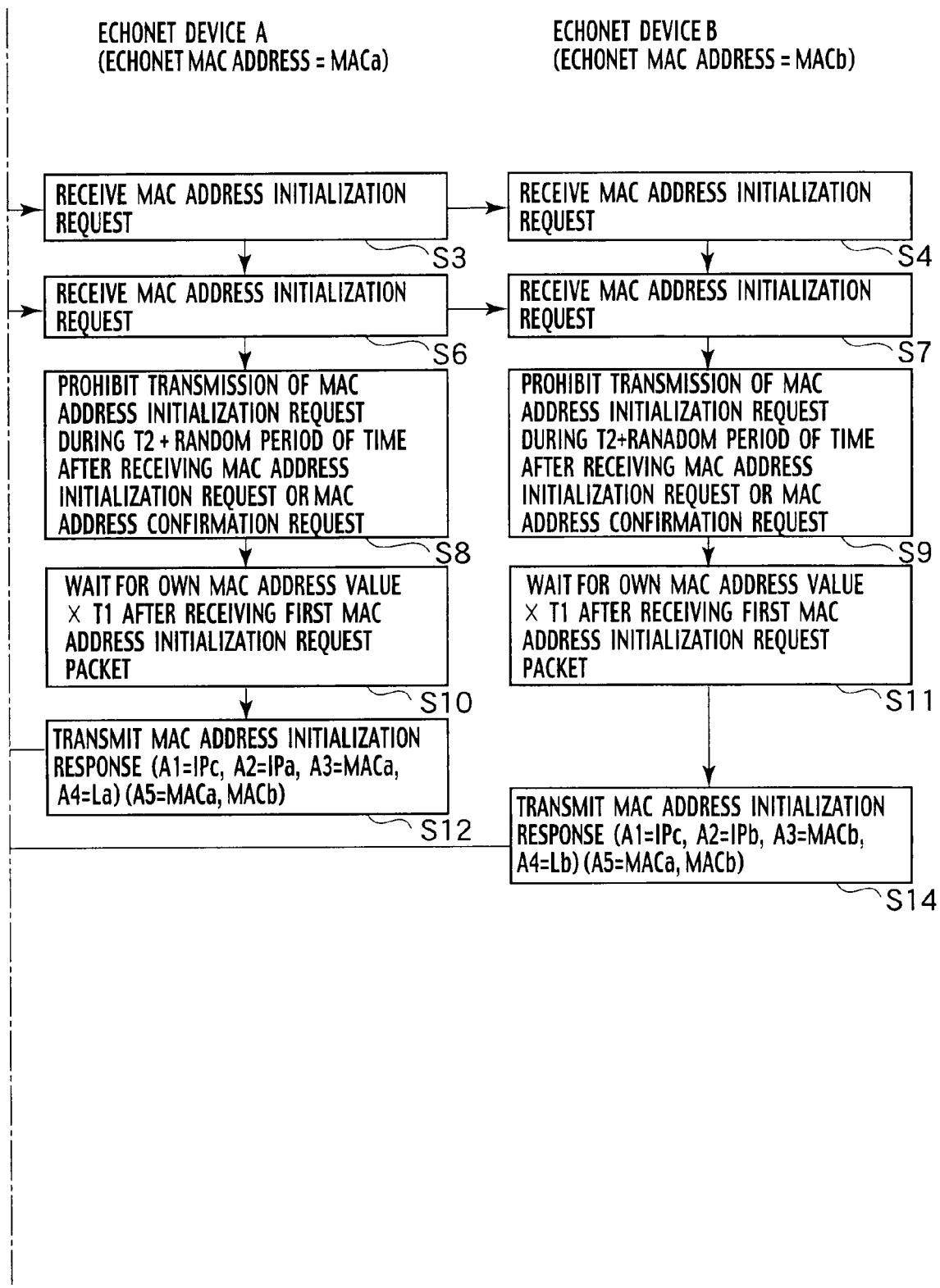
Figure 5:
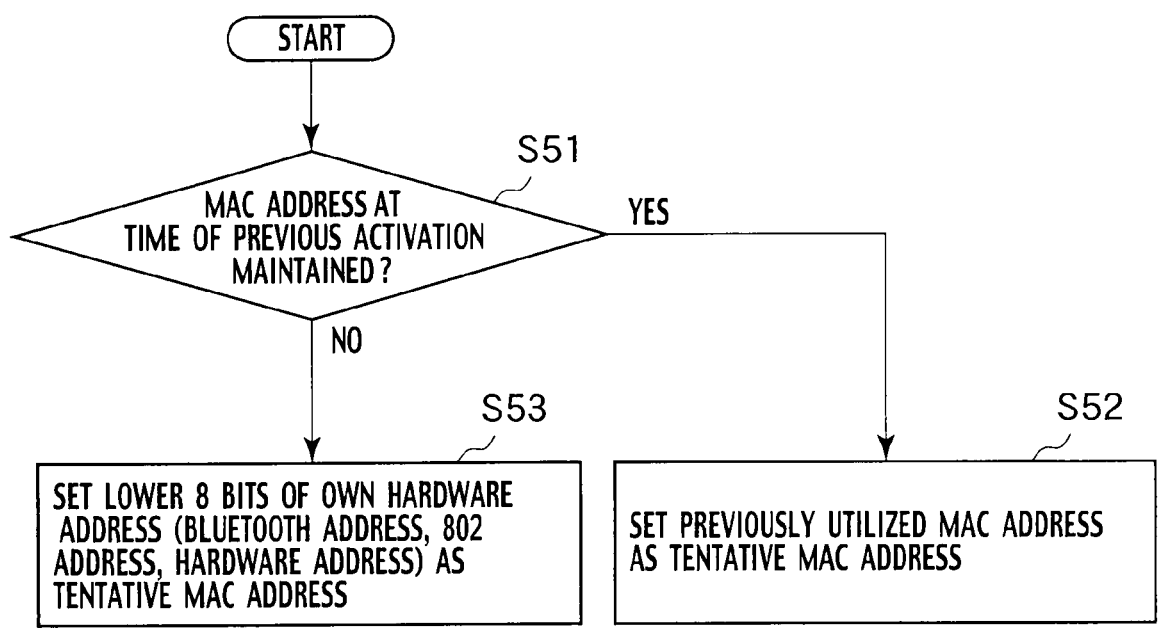
FIG. 5 is a flow chart showing an exemplary processing procedure for determining an initial value of the Echonet MAC address (tentative MAC address).

FIGS. 4A and 4B show an exemplary Echonet MAC address initialization sequence. FIG. 5 shows an exemplary processing procedure for determining an initial value of the Echonet MAC address (tentative MAC address).

Here, a part of the hardware address such as a value of lower 8 bits of own Bluetooth address, for example, will be used as the Echonet MAC address. If a node for which the above described part of the hardware address is overlapping exists within the same subnet and if that value is used, the overlap of the Echonet MAC address value would occur in the subnet, so that in this embodiment, even in such a case, the own Echonet MAC address is determined while avoiding the overlap of the Echonet MAC address by using the method described in the following.

Suppose that the Echonet device A and the Echonet device B are initially belonging to a piconet for which the PAN base station 1 is the Bluetooth master (abbreviated hereafter as BT master). In other words, suppose that two Echonet nodes of the Echonet device A and the Echonet device B are existing in this piconet at this point. In such a state, consider the case where the Echonet device C tries to join this piconet.

As shown in FIG. 5, the Echonet device C judges whether the MAC address at a time of the previous activation is maintained or not (step S51), and if it is maintained, the Echonet device C sets the previously utilized MAC address as a tentative MAC address (step S52), whereas if it is not maintained, the Echonet device C sets the lower 8 bits of the own hardware address as a tentative MAC address (step S53).

In FIGS. 4A and 4B, an exemplary case where the value of the previously utilized Echonet MAC address is set as the tentative MAC address will be described (step S1). Note that, in FIGS. 4A and 4B, A1 denotes a destination IP address, IPm denotes an Echonet node multicast address, A2 denotes a source IP address, A3' denotes a source Echonet tentative MAC address, A3 denotes a source Echonet MAC address, A4 denotes a source Bluetooth address, and A5 denotes currently used Echonet MAC addresses.

The Echonet device C broadcasts a MAC address initialization request packet containing the value of the lower 8 bits of the above described hardware address (or it may be an IP multicast address allocated to the Echonet node) to the local link, to check the overlap of that Echonet address value (steps S2 to S4). This packet may be transmitted for a plurality of times in order to prevent the case where this packet fails to reach there due to the radio state in the network or the state of the receiving node. This embodiment is directed to the exemplary case of transmitting it twice (steps S5 to S7).

This MAC address initialization request packet has three meanings. The first meaning is to detect a MAC address server existing on the network. Here, the MAC address server implies a server node which assigns a value of the MAC address according to the request, which will be described in further detail in the second embodiment described blow. The second meaning is to check whether there exists a node on the network which is trying to utilize the value of the own tentative MAC address or not. The third meaning is to learn the correspondence relationship between an IP address of the Echonet device 2 on the network, the Echonet MAC address, and the hardware address.

Another node that received the MAC address initialization request packet or a MAC address confirmation request packet to be described below that is transmitted from the Echonet device C is controlled not to transmit the MAC address initialization request packet for T2+random period of time (steps S8 and S9). The Echonet device C ascertains the tentative MAC address as its own MAC address unless there is another Echonet node which is using the identical MAC address, or the MAC address initialization request or the MAC address confirmation request for the identical MAC address is received from another Echonet device A or B, within the above described T2+random period of time.

In this way, it is possible to prevent the fluctuation at a time of determining the MAC address. Namely, when some device P is trying to utilize a specific MAC address, it is possible to prevent a repetition of act by which another device Q robs a right to utilize that specific MAC address or conversely the device P robs a right to utilize the MAC address of another device Q.

If all the nodes on the network respond to the receiving of the MAC address initialization request packet simultaneously, the congestion would occur at the transmitting node (Echonet device C). For this reason, each one of the Echonet devices A, B and C returns a response to the MAC address initialization request after waiting for a period of time obtained by multiplying the own Echonet MAC address value with a period of time T1, so as to prevent the congestion of signals to be received by the Echonet device C (steps S10, S11).

After the period of time defined by the steps S10 and S11 has elapsed, the Echonet device 2 that received the MAC address initialization request packet returns its own MAC address by utilizing the MAC address initialization response packet (steps S12 to S15). At this point, the IP address and the hardware address are also returned at the same time. The reason for returning its own MAC address is the second and third meanings described above, that is, to check whether a node that is trying to utilize the own tentative MAC address value exists on the network or not, and to learn the correspondence relationship of the IP address, the Echonet MAC address and the hardware address of the Echonet device 2 on the network.

Note that this MAC address initialization response packet may contain "MAC address values that should not be utilized", which is indicated as A5: currently used Echonet MAC addresses in the figure. These values may include the MAC addresses of the Echonet nodes on the network that are currently comprehended by a node that is transmitting this packet, or the MAC addresses of the Echonet nodes that have been active within a prescribed period of time (which may or may not be active at that point). In the case of including the MAC addresses of the Echonet nodes that are not active at that point, the MAC addresses for which a prescribed period of time has elapsed since the non-active state is confirmed should not be included as the currently used MAC addresses.

When the MAC address initialization response packet indicating that the Echonet MAC address (node ID) identical to the inquired value is currently used is not returned within a prescribed period of time (T2), the Echonet device C judged that there is no overlap and broadcasts the MAC address confirmation request packet to the network in order to check the presence/absence of the node that is using the tentative MAC address value again (step S17). Here, when the response packet for this MAC address confirmation request packet is not returned within a prescribed period of time (T2), it is judged that there is no MAC address overlap in the network, and the tentative MAC address value is determined as the Echonet MAC address (node ID) to be used by the own device (step S19). This judgement is made after waiting for the period of time T2 since the last MAC address confirmation request packet is transmitted (step S18). Here, the value of T2 is given by a product of the maximum number of the Echonet devices 2 that can be existing on the network and the period of time T1.

Figure 6A:
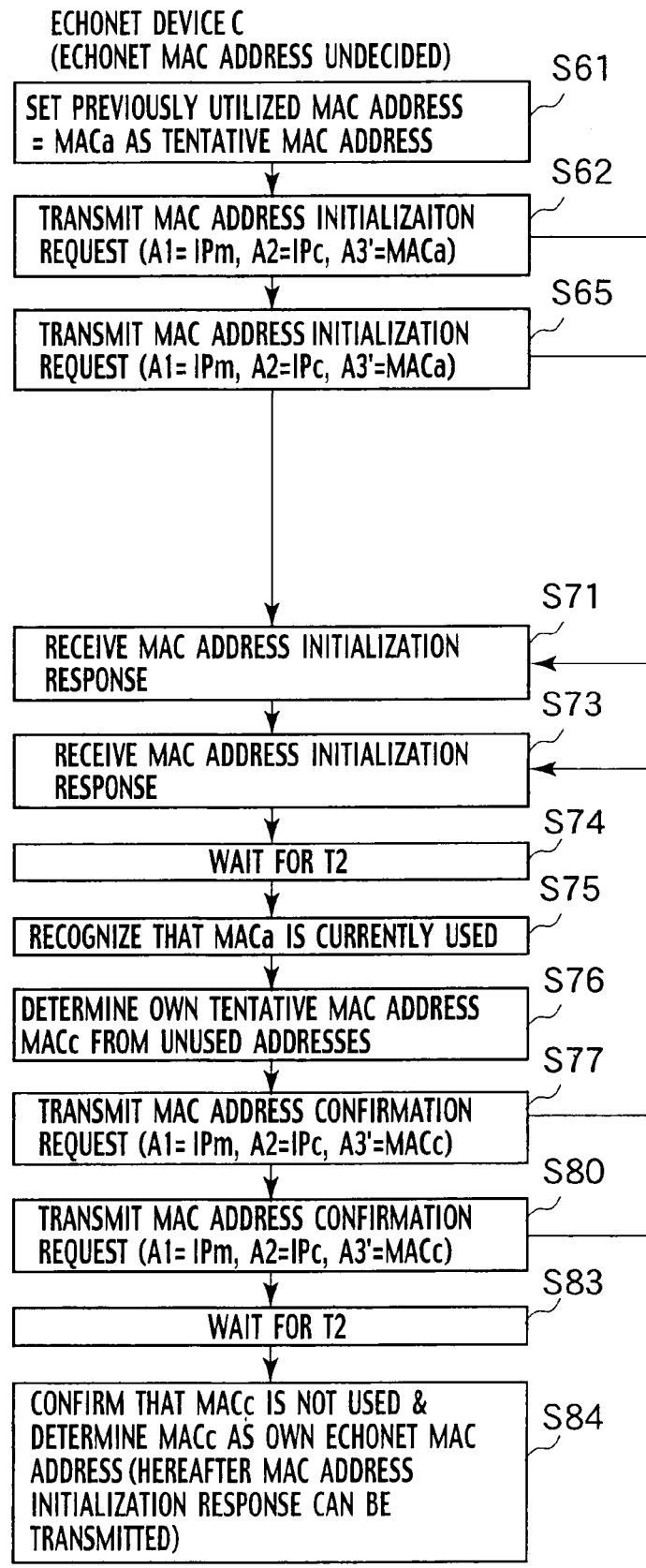

FIGS. 6A and 6B show a processing procedure in the case where the same address as the tentative MAC address transmitted by the Echonet device C is already used by another Echonet device. Note that, in FIGS. 6A and 6B, A1 denotes a destination IP address, IPm denotes an Echonet node multicast address, A2 denotes a source IP address, A3' denotes a source Echonet tentative MAC address, A3 denotes a source Echonet MAC address, A4 denotes a source Bluetooth address, and A5 denotes currently used Echonet MAC addresses.

At the steps S61 to S74 of FIGS. 6A and 6B, the processings similar to those of the steps S1 to S6 and S10 to S16 of FIGS. 4A and 4B are carried out. However, at the step S61, the Echonet MAC address MACa of the Echonet device is set as the tentative MAC address.

The Echonet device C recognizes that the same MAC address is currently used by another node (Echonet device A) (step S75), and determines its own tentative MAC address from unused addresses (step S76). Here, it is assumed that MACc is determined as the tentative MAC address.

Next, the MAC address confirmation request is broadcast twice to other nodes (Echonet devices A and B) (steps S77 to S82). Then, after waiting for a prescribed period of time T2 (step S83), the fact that MACc is not used is confirmed, and MACc is determined as its own Echonet MAC address (step S84).

On the other hand, there can be cases where the Echonet device C receives the MAC address initialization request or the MAC address confirmation request for the tentative MAC address=MACc from another node on the network within the period of time T2 since the transmission of the MAC address initialization request for the tentative MAC address=MACc. In such a case, there is a need for the Echonet device C to withdraw the transmitted MAC address initialization request and carry out the processing from the step of transmitting the MAC address initialization request again, after waiting for T2+random period of time or longer. A new tentative MAC address to be selected at that point should preferably be another value different from the one selected previously, in order to lower a possibility of having the MAC address overlap. Also, the tentative MAC address requested by the MAC address initialization request or the MAC address confirmation request that is received while waiting for the period of time T2 should not be selected as the new tentative MAC address.

Figure 7:
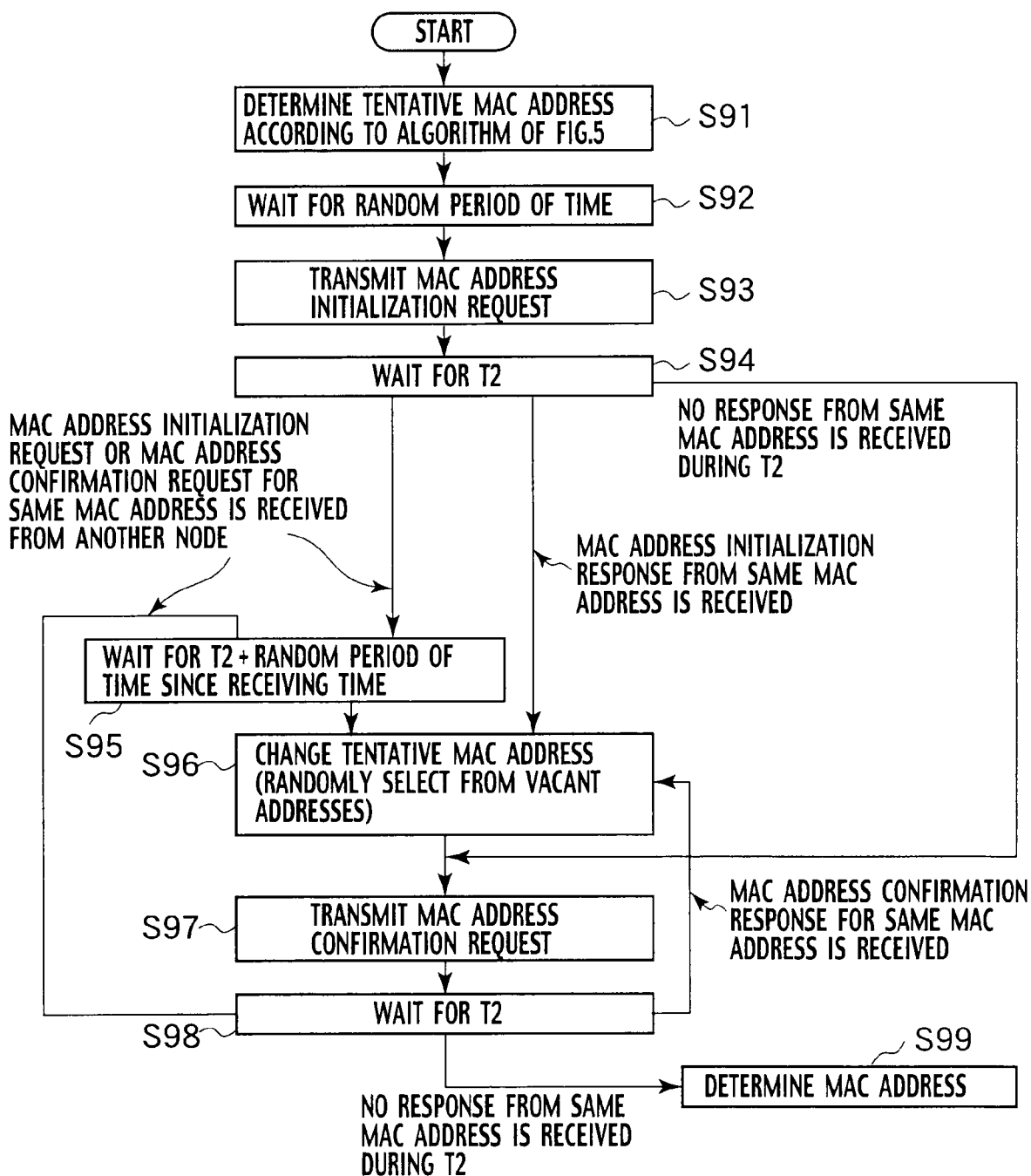
FIG. 7 is a diagram showing a state transition in the processing procedures shown in FIGS. 4A and 4B to FIGS. 6A and 6B according to the first embodiment of the present invention.

FIG. 7 shows a state transition in the processing procedures of FIGS. 4A and 4B to FIGS. 6A and 6B. First, the tentative MAC address is determined according to the algorithm of FIG. 5 (step S91), and a random period of time is waited (step S92). Then, the MAC address initialization request is transmitted (step S93), and the period of time T2 is waited (step S94).

When the MAC address initialization response indicating that another node is using the same MAC address is received, the tentative MAC address is changed (step S96), and the MAC address confirmation request is transmitted (step S97).

After that, the period of time T2 is waited (step S98), and when the MAC address confirmation response indicating that another node is using the same MAC address is received while waiting, the processing of the steps S96 to S98 is repeated. On the other hand, when no MAC address confirmation response indicating that another node is using the same MAC address is received after waiting for the period of time T2 at the step S97, the tentative MAC address is determined as the MAC address (step S99).

As can be seen from the state transition of FIG. 7, as long as there is a MAC address confirmation response indicating that another node is using the same MAC address, the tentative MAC address is to be changed repeatedly, so that it is preferable to store the tentative MAC address in an internal memory region or the like during this processing.

As described, in the first embodiment, the other nodes on the network are prohibited to transmit the address initialization request for a prescribed period of time since the MAC address initialization request is received, so that the conflict of the initialization requests for the same MAC address will not occur and the problem of assigning the address in overlap will not arise. Also, in the case where there are two nodes that are transmitting the MAC address initialization request or the MAC address confirmation request for the same MAC address simultaneously, at least one of the nodes (or both nodes) interrupts the MAC address determining procedure as described above, and is prohibited to transmit the address initialization request for a prescribed period of time, so that it is possible to expect the other node to determine the MAC address during that period of time, and therefore it becomes possible to prevent the fluctuation at a time of the MAC address determination.

Also, each node that received the address initialization request is prohibited to transmit the address initialization response until its own MAC address value×prescribed period of time T1 has elapsed since the address initialization request is received, so that a problem of receiving a plurality of responses in conflict can be prevented.

Figure 8A:
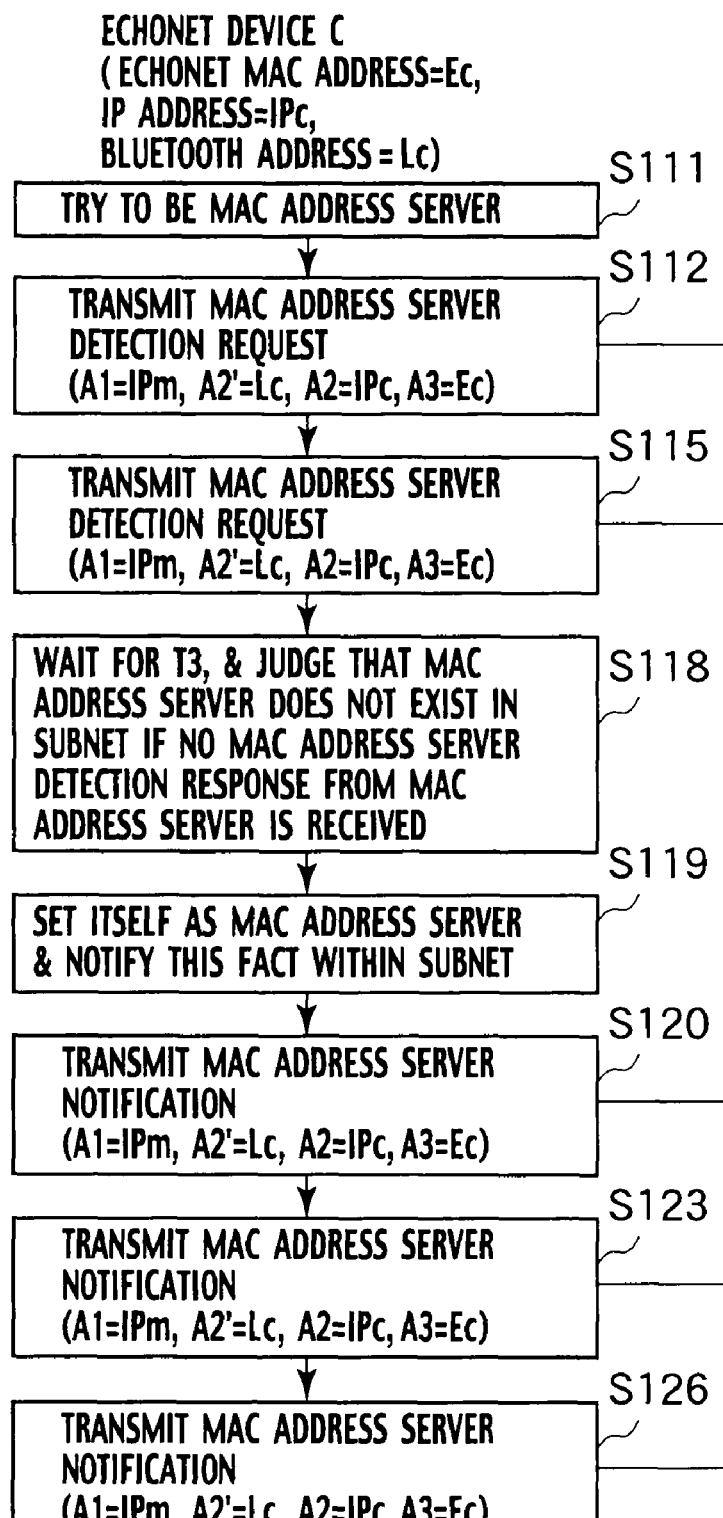
FIGS. 8A and 8B are a flow chart showing a processing procedure in a case where one node tries to become a MAC address server according to the second embodiment of the present invention.
Figure 8B:
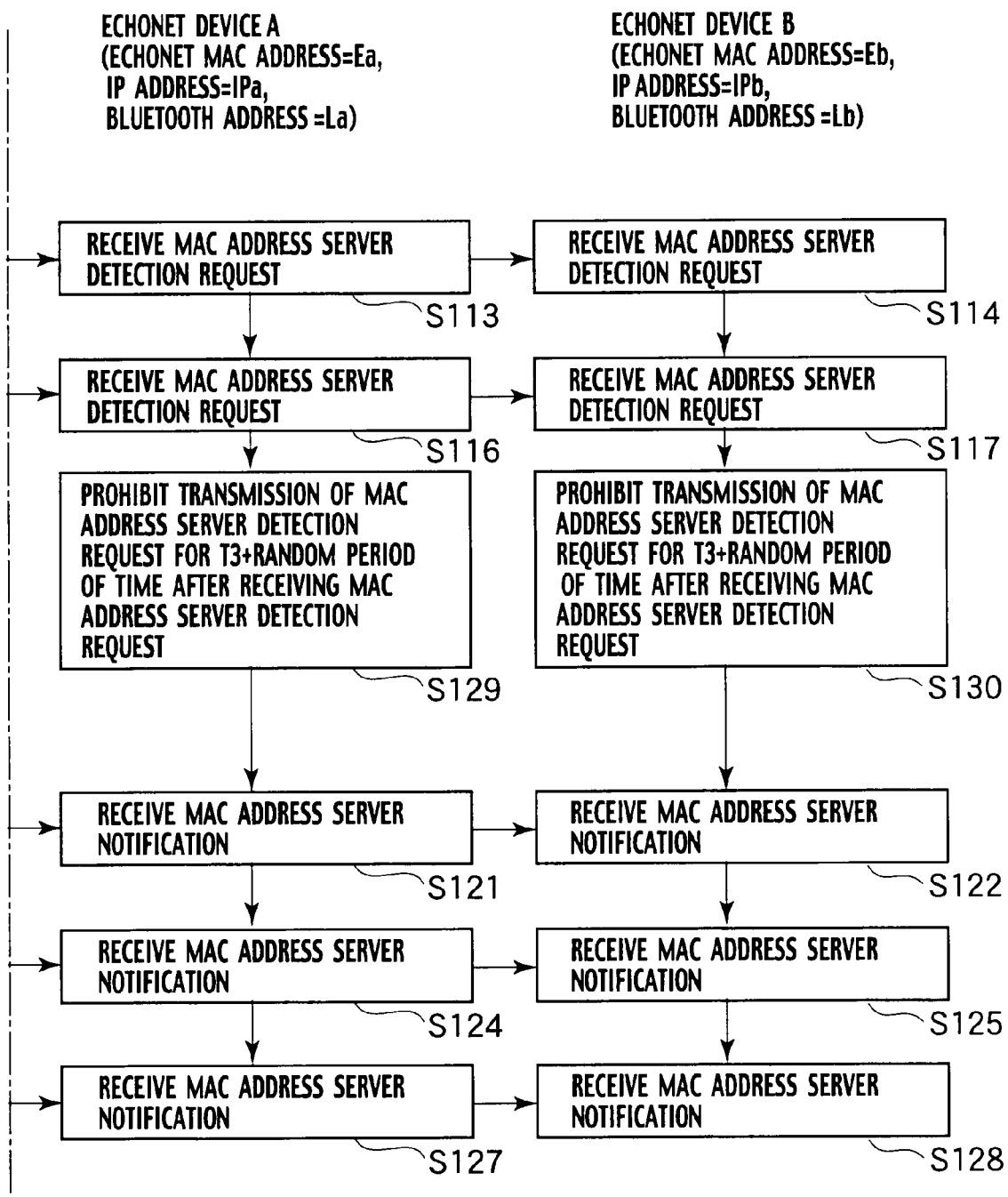

Referring now to FIGS. 8A and 8B, the second embodiment of a communication device, a communication system and a communication method according to the present invention will be described in detail.

The second embodiment is directed to the prevention of the conflict in the case of determining the MAC address server.

In the Echonet of the second embodiment, there exists a node which has a right to assign the address to the Echonet node which requested an assignment of the Echonet MAC address. Such a node is referred to as a MAC address server.

In the case where the MAC address server exists, when the MAC address initialization request packet of the first embodiment is received, the MAC address server returns the MAC address value to be utilized by that node (Echonet device C in this embodiment), to the node that transmitted that MAC address initialization request packet. This MAC address server may be provided at most one in one network (within the Echonet subnet).

In the following, the processing procedure in the case where an arbitrary node on the network tries to become this MAC address server. FIGS. 8A and 8B shows the processing procedure in the case where some node (Echonet device C in this example) tries to become the MAC address server. Note that, in FIGS. 8A and 8B, A1 denotes a destination IP address, IPm denotes an Echonet node multicast address, A2' denotes a source Bluetooth address, A2 denotes a source IP address, and A3 denotes a source Echonet MAC address.

The node that wishes to become the MAC address server first broadcasts a MAC address server detection request packet for a plurality of times in order to check whether the MAC address server already exists in the network or not (step S111 to S117).

At this point, the node that has already become the MAC address server responds to this packet by the unicast (or broadcast), to notify that the MAC address server already exists in this network. When this packet is received, the Echonet device C abandons an attempt to become the MAC address server at this point.

On the other hand, after waiting for a period of time T3, if no MAC address server detection response from the MAC address server is received, it is judged that the MAC address server does not exist within the subnet (step S118). In this case, that node regards that a right to become the MAC address server is obtained, notifies that fact within the subnet (step S119), and broadcasts the MAC address server notification packet in the network for a plurality of times (three times in this example) (steps S120 to S128).

Here, the other nodes that received this MAC address server detection request packet are prohibited to try to become the MAC address server, that is to transmit the MAC address server detection request packet, for T3+random period of time (steps S129, S130). Within this period of time, the Echonet device C can transmit the MAC address server notification packet if it is becoming the MAC address server. In this way, it becomes possible to prevent the fluctuation at a time of determining the MAC address server (that is, the situation in which some device P tries to become the MAC address server and transmits the MAC address server detection request packet, then another device Q also tries to become the MAC address server and transmits the MAC address server detection request packet to rob the right of the device P, and then the device P robs the right of the device Q, and this situation is repeated).

Here, when the Echonet device C transmitted some MAC address server detection request, there can be cases where the Echonet device C receives the MAC address server detection request transmitted by another node on the network. For example, it is the case when two or more nodes are trying to become the MAC address server simultaneously. In such a case, there is also a need for the Echonet device C to withdraw the transmitted MAC address server detection request and carry out the processing from the step of transmitting the MAC address server detection request again, after waiting for T3+random period of time or longer. After the above processing, the Echonet device C becomes the MAC address server.

As described, in the second embodiment, the transmission of the MAC address server detection request is prohibited until a prescribed period of time T3+random period of time elapses since the MAC address server detection request is received, so that the conflict on the Echonet by a plurality of MAC address server detection requests will not occur, and it is possible to determine the MAC address server uniquely.

As described, according to the present invention, the other communication devices are prohibited to transmit the address initialization request for a prescribed period of time since one communication device transmitted the address initialization request for an address managed by a control protocol, so that the conflict of the initialization requests for the same address will not occur and the problem of assigning the address in overlap to the communication devices will not arise.

Also, according to the present invention, the other communication devices are prohibited to transmit the address server detection request packet for a prescribed period of time since one communication device transmitted the address server detection request packet, so that the conflict on the network by a plurality of address server detection requests will not occur, and it is possible to determine the MAC address server uniquely.

Note that, in the embodiments described above, the Echonet protocol is used as a protocol for controlling devices connected to the network, but the present invention is not limited to this specific case and also applicable to the other various control protocols.

Also, in the above, the exemplary cases of using the Bluetooth or the IP (IP over Bluetooth) as the local area network, but the present invention is also applicable to the networks in the other schemes.

Also, in the above, the exemplary case of using the home network as the local area network, but the present invention is also applicable to the other local area network such as intranet.

It is to be noted that the above described embodiments according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, the communication device of each of the above described embodiments can be conveniently implemented in a form of a software package.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

Obviously, numerous modifications and variations of the present invention are possible in light of the above teachings. It is therefore to be understood that within the scope of the appended claims, the invention may be practiced otherwise than as specifically described herein.

What is claimed is:

1. A communication system for carrying out communications with other communication devices by using a prescribed control protocol on a network, at least one of the communication devices comprising:
a digital computer programmed to execute plural programming units comprising:
a first tentative address determination unit configured to determine a first tentative address which is a candidate for one of addresses managed by the prescribed control protocol;
a packet transmission unit configured to transmit an address initialization packet containing the first tentative address to the network, in order to check presence/absence of another communication device which is using an address identical to the first tentative address;
a confirmation packet transmission unit configured to transmit an address confirmation packet containing the first tentative address to the network when not receiving, from another communication device within a first prescribed period of time since transmitting the address initialization packet, any of a response packet indicating that an address identical to the first tentative address is currently used, an address initialization packet containing the first tentative address and an address confirmation packet indicating that the first tentative address is determined as an address of the another communication device; and
an address determination unit configured to determine the first tentative address as an address of the communication device, when not receiving, within a second prescribed period of time since transmitting the address initialization packet, any of a response packet indicating that an address identical to the first tentative address is currently used, an address initialization packet containing the first tentative address and an address confirmation packet indicating that the first tentative address is determined as an address of the another communication device, wherein, when receiving, from another communication device within the first prescribed period of time since transmitting the address initialization packet, any of a response packet indicating that an address identical to the first tentative address is currently used, an address initialization packet containing the first tentative address or an address confirmation packet indicating that the first tentative address is determined as an address of the another communication device, the confirmation packet transmission unit transmits an address confirmation packet containing a second tentative address which is different from the first tentative address to the network, and the use of the first tentative address is prohibited for a period of time no shorter than the first prescribed period of time.

2. The communication device of claim 1, wherein the prescribed control protocol is an Echonet protocol.

3. A communication system for carrying out communications with a plurality of communication devices by using a prescribed control protocol on a network, at least one communication device of the plurality of communication devices comprising:

a digital computer programmed to execute plural programming units comprising:

a server request transmission unit configured to transmit an address server detection request packet for requesting to become an address server which has a right to determine addresses managed by the prescribed control protocol;

wherein the address server detection request packet contains a first tentative address;

a server determination unit configured to determine the communication device as the address server, when no response packet from any communication device of the plurality of the communication devices indicating that it is another address server detection request packet containing the first tentative address is received within a first prescribed period of time since transmitting the address server detection request packet containing the first tentative address; and a control unit configured to control the server request transmission unit in order that, when the another address server detection request packet containing the first tentative address is not received from any communication device of the plurality of the communication devices, the server request transmission unit transmits the address server detection request packet containing the first tentative address again after a second prescribed period of time which is longer than the first prescribed period of time; and wherein, when receiving a response packet from any communication device of the plurality of the communication devices indicating that it is another address server detection request packet containing the first tentative address is received within the first prescribed period of time since transmitting the address server detection request packet containing the first tentative address, the server request transmission unit configured to transmit transmits another address server detection request packet containing a second tentative address which is different from the first tentative address to the network, and the use of the first tentative address is prohibited for a period of time no shorter than the first prescribed period of time.

4. The communication device of claim 3, wherein the prescribed control protocol is an Echonet protocol.

5. A communication device for carrying out communications with other communication devices by using a prescribed control protocol on a network, comprising:

a digital computer programmed to execute plural programming units comprising:

a first tentative address determination unit configured to determine a first tentative address which is a candidate for one of addresses managed by the prescribed control protocol;

a packet transmission unit configured to transmit an address initialization packet containing the first tentative address to the network, in order to check presence/absence of another communication device which is using an address identical to the first tentative address and requesting the other communication devices to return information about the addresses being used by the other communication devices;

a confirmation packet transmission unit configured to transmit an address confirmation packet containing the first tentative address to the network when not receiving, from another communication device within a first prescribed period of time since transmitting the address initialization packet, any of a response packet indicating that an address identical to the first tentative address is currently used, an address initialization packet containing the first tentative address and an address confirmation packet indicating that the first tentative address is determined as an address of the another communication device; and an address determination unit configured to determine the first tentative address as an address of the communication device, when not receiving, within a second prescribed period of time since transmitting the address initialization packet, any of a response packet indicating that an address identical to the first tentative address is currently used, an address initialization packet containing the first tentative address and an address confirmation packet indicating that the first tentative address is determined as an address of the another communication device, wherein, when receiving, from another communication device within the first prescribed period of time since transmitting the address initialization packet, any of a response packet indicating that an address identical to the first tentative address is currently used, an address initialization packet containing the first tentative address or an address confirmation packet indicating that the first tentative address is determined as an address of the another communication device, and the confirmation packet transmission unit transmits an address confirmation packet containing a second tentative address which is different from the first tentative address to the network, wherein, within at least the first prescribed period of time after receiving the address initialization packet transmitted from the another communication device, the packet transmission unit is not allowed to transmit, to the network, the address initialization packet containing an address identical to the first tentative address which is contained in the received address initialization packet.

6. The communication device of claim 5, wherein the tentative address determination unit uses a previously used address as the tentative address if the previously used address is maintained, or uses a part of a hardware address of the communication device as the tentative address otherwise.

7. The communication device of claim 5, wherein the second prescribed period of time is longer than the first prescribed period of time.

8. The communication device of claim 5, wherein the packet transmission unit transmits at least one of the address initialization packet and the address confirmation packet to the network for a plurality of times.

9. The communication device of claim 5, wherein the prescribed control protocol is an Echonet protocol.

* * * * *